June 24, 1930.   D. G. ACKERLY   1,766,051
RECTIFIER CIRCUIT
Filed Oct. 29, 1926

INVENTOR:
D. G. Ackerly,
by A. R. Vencill
His Attorney

UNITED STATES PATENT OFFICE

DONALD G. ACKERLY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RECTIFIER CIRCUIT

Application filed October 29, 1926. Serial No. 145,008.

My invention relates to rectifier circuits, and more particularly to apparatus for obtaining a smooth direct current from a source of alternating current without the use of condensers.

I will describe several forms of apparatus embodying my invention, and will then point out the novel features thereof in claims.

Figure 1:
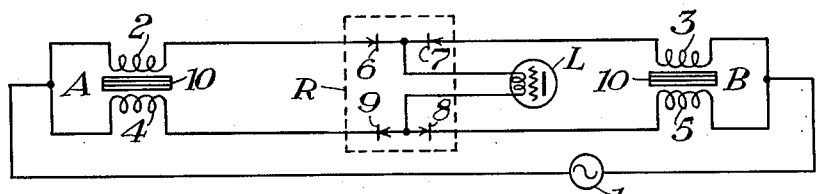
Figure 2:
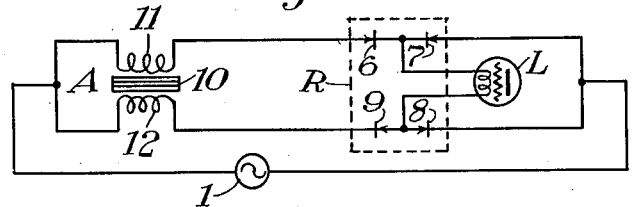
Figure 3:
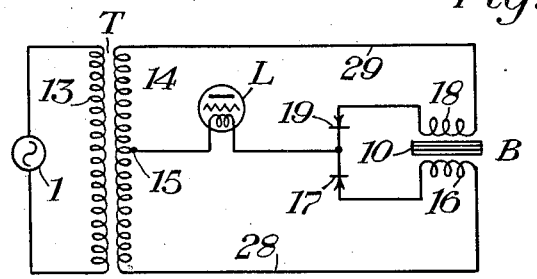
Figure 4:
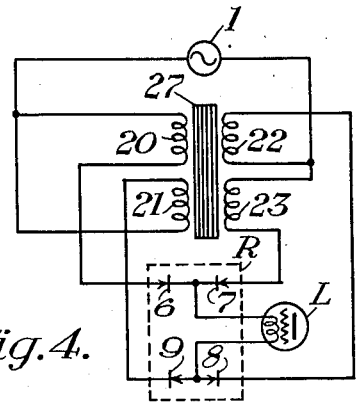
Figure 5:
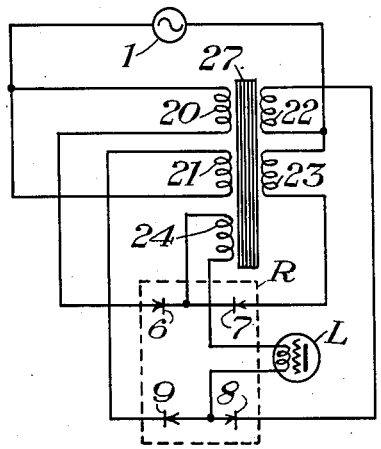
Figure 6:
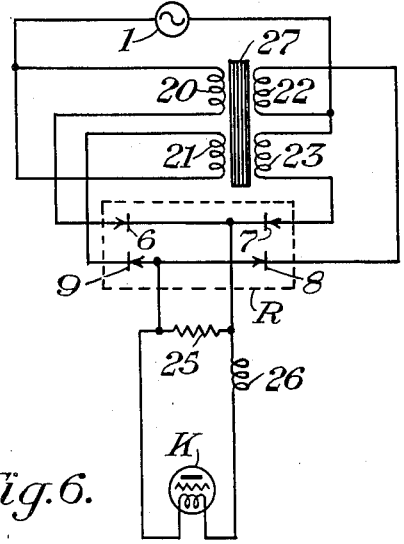

In the accompanying drawing, Fig. 1 is a diagrammatic view of one form of rectifier circuit using two transformers and embodying my invention. Fig. 2 is a modification of Fig. 1 in which a single transformer is used. Fig. 3 is a modification of Fig. 2 showing a center tapped transformer for two-way rectification. Figs. 4, 5 and 6 are further modifications of the structure shown in Fig. 1, with the transformer windings on a single core, and also embodying my invention.

Similar reference characters refer to similar parts in each of the several views.

Referring first to Fig. 1, the apparatus comprises a circuit for two-way rectification in which the alternating current from a suitable source 1 is supplied to a load L through two transformers A and B and a rectifier R. The load L may be any current-consuming device, and is here illustrated as an electron tube similar to those used in radio receiving circuits and the like.

The transformer A comprises a core 10 of magnetizable material carrying two windings 2 and 4. Similarly, the core 10 of transformer B carries two windings 3 and 5.

The rectifier R comprises a plurality of asymmetrical elements 6, 7, 8 and 9. These elements may be of any suitable type offering a higher resistance to current flowing through the element in one direction than to current flowing through the element in the other direction and are preferably of a type in which metals and metal compounds are used to perform the required function. For example, I have found that elements composed of copper with copper oxide formed thereon are particularly well suited for use in this circuit. The elements of rectifier R are so arranged that during half cycles of one relative polarity current flows from source 1 through winding 2, element 6, load L, element 8, and winding 5 back to the source 1, and during half cycles of the opposite relative polarity current flows from the source 1, through winding 3, element 7, load L, element 9, and winding 4 back to the source 1. The load L is therefore supplied with a uni-directional pulsating current from the source 1, the current flowing through windings 2 and 5 during half cycles of one relative polarity, and through windings 3 and 4 during half cycles of the other relative polarity. During each half cycle, when the current through the load would otherwise tend to decay, the energy stored in the magnetic circuit surrounding the transformer windings tends to maintain constant the current through the windings and therefore tends to prevent the decrease of the current.

Furthermore, the connections of the transformer windings are such that during the half cycles that current is being supplied to the load through windings 2 and 5, this current induces in windings 3 and 4 voltages which assist in smoothing out the pulsations in the current in the load. Thus when the current through windings 2 and 5 is increasing, the voltages induced in windings 3 and 4 are in such direction as to tend to send a current from left to right through these windings, but this current is opposed by rectifiers 7 and 9. When the current through windings 2 and 5 is decreasing, however, the voltages induced in windings 3 and 4 cause current to flow from right to left through these windings and this current can flow through rectifiers 7 and 9, and therefore through load L. The induced current in windings 3 and 4 will of course be displaced in phase from the current in windings 2 and 5, and it will therefore be plain that in addition to the smoothing effect of the reactance of windings 2 and 5, the energy supplied to the load by induction in windings 3 and 4 due to the decreasing current in windings 2 and 5 maintains more nearly constant in magnitude the total current flowing through the load L. In similar manner, during the half cycles that source 1 supplies current to the load L through windings 3 and 4, when such current tends to decrease, voltages are induced in windings 2 and 5 which send current through elements 6 and 8 and through load L, thereby tending to maintain constant the resulting current in the load and tending to eliminate pulsations in the current supplied to the load.

It will thus be seen that by providing four windings, two of which supply current to the load during half cycles of one relative polarity and the other two of which supply current to the load during half cycles of the opposite relative polarity, I am enabled to prevent the load current from dying out appreciably between half waves and to reduce the pulsations in the rectified current supplied to the load to such an extent that the current may be used to supply the filaments of the vacuum tubes used in radio receiving apparatus without producing objectional disturbance in the circuits.

In Fig. 2, I have shown a modified form of circuit in which a single transformer A is used, the rectifier elements 7 and 8 being connected directly with the source 1. The operation of the apparatus is similar to that described in connection with Fig. 1, the inductance of the transformer windings serving to partially smooth out the pulsations in the rectified current, and the voltage induced in one transformer winding due to a decrease in the current supplied to the load through the other winding tending to further reduce the pulsations, by supplying to the load a current which has its peak displaced in phase with the polarity of the pulsating current supplying uni-directional current to the load. The arrangement shown in Fig. 2 is not as effective as that shown in Fig. 1 because of the omission of transformer B.

Fig. 3 is a modified arrangement of the apparatus of Fig. 2 using a center tapped transformer for two-way rectification. In this arrangement current from the source 1 is supplied to the primary 13 of a transformer T. The secondary 14 of this transformer is tapped at the electrical mid-point 15. One-half of the secondary 14 is connected through wire 28 with a winding 16 of transformer B, a rectifier element 17 and the load L. The other half of winding 14 is also connected with load L through wire 29, winding 18 and rectifier element 19. The windings 16 and 18 are opposed so that an increasing current from right to left in winding 16, causes a current to flow from left to right in winding 18. Current flows in secondary 14 outwardly from the tap 15; during one-half cycle through wire 28, winding 16, element 17 and load L back to the tap 15, and during the other half cycle through wire 29, winding 18, element 19, and load L back to tap 15. The smoothing of the rectified current is accomplished in substantially the manner as described with reference to Figs. 1 and 2 and the use of a center tapped transformer enables me to get full-wave rectification using only two rectifier elements.

Fig. 4 is a further modification of the apparatus shown in Fig. 1 in a more compact form with the transformer windings wound on a single core. The transformers A and B of Fig. 1 are replaced by a split transformer comprising four windings 20, 21, 22 and 23, wound in the same direction from top to bottom on an iron core 27. Current passes from the source 1 during one half cycle through winding 20, element 6, load L, element 8, and winding 22 back to the source 1. During the other half cycle it flows from source 1 through winding 23, element 7, load L, element 9, and winding 21 back to source 1. The operation of this modification is substantially the same as that described with reference to the apparatus shown in Fig. 1. When the current through winding 20, element 6, load L, element 8 and winding 22 is decreasing, the voltages induced in windings 21 and 23 tend to send a current through the elements 7 and 8 to the load, and the pulsations in the total current in the load are correspondingly decreased. In similar manner the voltages induced in windings 20 and 22 due to a decrease in the current through windings 21 and 23 during half cycles of the other polarity tend to smooth out pulsations in the current supplied to the load. This arrangement utilizes the energy received from the source 1 more effectively than a reactor in series with the load. For example, the circuit shown in Fig. 4, using a split transformer to get a certain output with a certain amount of smoothing, required 34.4 watts input, while the same circuit using a reactor in series with the load in place of the split transformer, required an input of 51.6 watts for the same output.

Fig. 5 differs from Fig. 4 in the addition of a reactor 24, wound on the core 27 with the windings 20, 21, 22 and 23, but connected in series with the load. The addition of reactor 24 results in a still further smoothing of the rectified current because the inductance of this winding causes it to absorb energy from the circuit at the peak of a wave and to supply energy to the circuit between the peaks. The net effect of this action is to make the average value of the direct current in load L more nearly constant than it would be without the reactor.

Fig. 6 is a further modification of Fig. 4 in which the load L of Fig. 4 is replaced by a shunt resistance 25. The load K having a reactor 26 in series with it, is connected across the resistance 25. The operation of the circuit to this point is the same as that described with reference to Fig. 4. The rectified current supplied through the split transformer and rectifier R has a small alternating component and this current produces a drop in potential across the resistance 25. The reactor 26 has a low resistance to the direct current component of the rectified current but offers a high impedance to the alternating-component hence the current supplied to load K has a smaller alternating component than the current supplied to resistance 25. By the addition of further shunt resistances and reactors the smoothing may be still further increased.

Although I have herein shown and described only a few forms of rectifier circuit embodying my invention, it is understood that various changes and modifications may be made therein within the scope of the appended claims without departing from the spirit and scope of my invention.

Having thus described my invention, what I claim is:

1. The combination with a source of alternating current, of two transformers connected thereto, a rectifier comprising a plurality of asymmetric elements the elements offering low resistance to current in one direction being connected between a first winding of the first transformer and a first winding of the second and the elements offering low resistance to current in the other direction being connected between a second winding of the second transformer and a second winding of the first transformer, and a load supplied by the rectified current.

2. The combination with a source of alternating current, of two transformers each having two windings connected together and also connected to the source, a full-wave rectifier composed of asymmetric elements connected between the transformers, and a load supplied by the rectified current.

3. The combination with a source of alternating current, of four inductively related windings connected to the source, a rectifier comprising four asymmetric elements, two of the elements being connected between and in series with two of the windings and the other two elements being connected between and in series with the other two windings, and a load connected to the rectifier.

4. The combination with a source of alternating current, of a split transformer comprising a magnetic core having four separate windings thereon and connected with the source, a full-wave rectifier composed of asymmetric elements, the elements offering low resistance to current flowing in one direction being connected between and in series with the first two of said windings, and the elements offering low resistance to current flowing in the other direction being connected between and in series with the other two of said windings, and a load supplied by the rectified current.

5. The combination with a source of alternating current, of four inductively related windings connected to the source, a full-wave rectifier having its elements for passing the positive half-wave of current connected between two of the windings and its elements for passing the negative half-wave of current connected between the other two windings and a load connected to the rectifier.

6. The combination with a source of alternating current, of a plurality of inductively related windings connected to said source, a full-wave rectifier having an element for passing the positive half-wave of current connected between certain of the windings, and an element for passing the negative half-wave of current connected between the remaining windings, and a load connected to the rectifier.

In testimony whereof I affix my signature.

DONALD G. ACKERLY.